(12) United States Patent
Meier (10) Patent No.: US 9,649,914 B2
(45) Date of Patent: May 16, 2017

(54) SHADING DEVICE FOR A WINDOW PANE OF AN AUTOMOTIVE VEHICLE

(71) Applicant: Horst Meier, Filderstadt (DE)

(72) Inventor: Horst Meier, Filderstadt (DE)

(73) Assignee: BOS GMBH & CO. KG, Ostfildern (DE)

(*) Notice: Subject to any disclaimer, the term of this patent is extended or adjusted under 35 U.S.C. 154(b) by 0 days.

(21) Appl. No.: 15/131,151

(22) Filed: Apr. 18, 2016

(65) Prior Publication Data
US 2016/0325607 A1    Nov. 10, 2016

(30) Foreign Application Priority Data

May 6, 2015 (DE) .................... 10 2015 208 441

(51) Int. Cl.
*B60J 1/00* (2006.01)
*B60J 1/20* (2006.01)

(52) U.S. Cl.
CPC .............. *B60J 1/203* (2013.01); *B60J 1/205* (2013.01); *B60J 1/2019* (2013.01); *B60J 1/2038* (2013.01); *B60J 1/2052* (2013.01); *B60J 1/2063* (2013.01); *B60J 1/2086* (2013.01)

(58) Field of Classification Search
CPC . B60J 1/203; B60J 1/2019; B60J 1/205; B60J 1/2052
USPC ........................... 296/97.8, 152; 160/370.22
See application file for complete search history.

(56) References Cited

U.S. PATENT DOCUMENTS

| | | | |
|---|---|---|---|
| 5,605,370 A * | 2/1997 | Ruiz | ............. B60J 1/2047 160/370.22 |
| 6,086,133 A | 7/2000 | Alonso | |
| 7,401,840 B2 * | 7/2008 | Schnoblen | ............. B60J 1/2044 160/370.22 |

FOREIGN PATENT DOCUMENTS

DE    10 2012 019 903 A1    5/2013

OTHER PUBLICATIONS

Search Report of European Patent Office issued in Application No. 16164897 with English translation of category of cited documents dated Sep. 30, 2016 (6 pages).

\* cited by examiner

*Primary Examiner* — Joseph D Pape
(74) *Attorney, Agent, or Firm* — Flynn, Thiel, Boutell & Tanis, P.C.

(57) ABSTRACT

Shading device including a shading structure displaceable between a lowered rest position and a deployed shading position in lateral guiding rails fixed to the vehicle. The shading structure is lowered through a passage into an accommodation chamber, wherein the passage is closed by a pivotably mounted lid. A control mechanism transfers the lid, in response to movement of a drive transmission, into an opened position. The control mechanism includes a control slider movably mounted transverse to the direction of displacement of the shading structure and in operative mechanical connection to the lid. The control mechanism includes a deflection device coupling the control slider, upon a movement of the drive transmission, to the drive transmission such that the control slider, upon movement of the drive transmission from the rest position of the shading structure in the direction of the shading position, transfers the closing lid to the opened position.

14 Claims, 5 Drawing Sheets

SHADING DEVICE FOR A WINDOW PANE OF AN AUTOMOTIVE VEHICLE

CROSS-REFERENCE TO RELATED APPLICATIONS

This claims priority from German Patent Application No. 10 2015 208 441.8, filed on May 6, 2015, the disclosure of which is hereby incorporated by reference in its entirety into this application.

FIELD OF THE INVENTION

The invention relates to a shading device for a window pane of an automotive vehicle, comprising a shading structure which is displaceable between a lowered rest position and a deployed shading position in lateral guiding rails fixed to the vehicle in the ready-for-use installed condition, with the aid of drive transmission means movably guided in the guiding rails, wherein the shading structure is capable of being lowered through a passage into an accommodation chamber fixed to the vehicle in the ready-for-use installed condition, wherein the passage is capable of being closed by means of a pivotably mounted closing lid, and wherein a control mechanism is provided in order to transfer the closing lid, in response to a movement of the drive transmission means, into an opened position.

BACKGROUND OF THE INVENTION

A shading device of such type is disclosed in DE 1 10 2012 019 903 A1. The shading device is provided for a side window pane of a passenger vehicle and includes a flexible shading structure in the form of a roller blind fabric. The shading structure in a lowered rest position is adapted to be received in a roller blind cartridge which is attached fixed to the vehicle below a bottom edge of a window frame of the side window pane. The shading structure is capable of being deployed to a shading position. In the roller blind cartridge the shading structure is held on a roller blind shaft to be wound up and wound off, which shaft is rotatably mounted within the roller blind cartridge. An end face region of the shading structure that is in front in the direction of deployment is held tensioned between two lateral entrainers which are disposed fixed to the vehicle at the side of the window frame in guiding rails fixed to the vehicle. For displacing the entrainers, drive transmission means in the form of flexshafts are mounted in the guiding rails and driven by a drive unit. The shading structure is deployed from a door paneling of the side door upwards through a passage slot in the vicinity of a top of the roller blind cartridge. Said passage slot is capable of being closed by a pivotably mounted closing lid. Using a spring device, force in the opening direction is permanently applied to the closing lid. A control mechanism is provided to maintain the closing lid closed, as long as the shading structure is arranged in its rest position within the roller blind cartridge. Also, the control mechanism performs opening of the closing lid in response to a displacement movement of the entrainer along the lateral guiding rails starting from the rest position of the shading structure. The control mechanism also controls return of the closing lid back to its closed position, when the shading structure is transferred back to the rest position starting from its shading position. The control mechanism includes an entrainer slide engaging the closing lid via a second spring device. Upon displacement of the flexshafts, at least one entrainer entrains the entrainer slide which acts on the closing lid via the second spring device.

SUMMARY OF THE INVENTION

It is an object of the invention to provide a shading device of the above mentioned type which allows reliable opening and closing of the closing lid.

The object is achieved in that the control mechanism includes a control slider which is movably mounted transverse to the direction of displacement of the shading structure and is in operative mechanical connection to the closing lid, and in that the control mechanism comprises a deflection device coupling the control slider, upon a movement of the drive transmission means, to at least one drive transmission means in such a manner that the control slider, upon a movement of the drive transmission means from the rest position of the shading device in the direction of the shading position, transfers the closing lid to the opened position. The control slider is movably mounted transverse to the displacement direction of the shading structure and is activated by means of the deflection device, which allows engagement on the closing lid at a distance to the corresponding lateral edge thereof, which is adjacent to the guiding rails fixed to the vehicle. This engagement of the closing lid, which is at a more central location as compared to the prior art, in order to pivot said lid, allows opening and closing of the closing lid using a single control slider, without the closing lid being subject to severe torsions during opening or closing, as would be the case with a lateral engagement of the control mechanism on the closing lid. The solution according to the invention is advantageous, since the closing lids typically have a relatively great length and a relatively small width or depth. Namely, the corresponding passage, which is closed by the closing lid, likewise has a relatively great length and a relatively small width. A lateral engagement on the closing lid would be apt to cause twisting, i.e. torsions, of the closing lid, which in the long run would cause a permanent deformation of the closing lid. As a result, malfunctions of the closing lid and qualitatively detrimental orientations of the closing lid in relation to the corresponding passage could occur. The solution according to the invention is advantageously employed in the domain of side window panes or in the domain of rear window panes of automotive vehicles, in particular passenger vehicles, but also in omnibuses or railway vehicles.

In an embodiment of the invention, the control mechanism comprises a spring unit exerting a permanent spring force on the control slider in the direction towards a final position, which force holds the closing lid in its opened position. In a further embodiment, the closing lid has an associated closing spring device exerting a permanent torque on the closing lid in the closing direction. The spring force acting permanently on the control slider causes the control slider to maintain the closing lid in its opened position for the time being while the shading structure is not completely returned to its rest position. Thereby, permanent mechanical support of the closing lid by the control slider is achieved, so that pivoting back of the closing lid to the closed position is prevented for the time being while the control slider is not moved back to its initial position by the control mechanism. The permanent spring force additionally ensures rattle-free positioning of the control slider in its final position. The closing spring device acting on the closing lid ensures that the closing lid is automatically pivoted back to its closed position as soon as the supporting by the control slider is overridden. The closing spring device also ensures that the closing lid is spring-loaded in the closed position so that, on the one hand, likewise rattle-free securing of the closing lid is obtained and, on the other hand, a pretension acting on the closing lid compensates for possible twisting or deformation of the closing lid, so that the closing lid can close the passage uniformly and securely over the entire length thereof. The spring unit is implemented by at least one tension spring means, preferably by a screw tension spring.

In a further embodiment of the invention, the deflection device includes a control member capable of being actuated by an entrainer of the drive transmission means, which member is coupled to the control slider. The entrainer of the drive transmission means controls the control member during a corresponding movement of the drive transmission means in order to move the shading structure in the direction towards its shading position or in the direction towards its rest position.

In a further embodiment of the invention, the control member is a pivot lever which is coupled to the control slider by means of a length adjustment element. The length adjustment element is provided to cause uniform force transmission between the pivotable pivot lever and the control slider capable of linear motion.

Advantageously, the length adjustment element is an elongated hole guide. In said embodiment, a lever arm of the pivot lever is coupled to the control slider via the elongated hole guide.

In a further embodiment of the invention, the spring unit is designed as a screw tension spring. Other tension spring means can be used as well. Advantageously, the screw tension spring engages on the control member. In this context, the screw tension spring is advantageously disposed fixed to the vehicle by one end. With the other end, the screw tension spring engages on the control member, preferably on a corresponding lever arm of the pivot lever, such that the pivot lever is spring-loaded in one rotational direction, wherein an axial force is applied to the control slider in the direction of the opened position of the closing lid.

In a further embodiment of the invention, the control slider is mounted in a guide channel for linear motion, which channel is arranged fixed in location in relation to the accommodation chamber. Thereby, a particularly stable and uniform linear guidance is achievable for the control slider. The control slider can be preassembled in the guide channel, in particular on the cartridge housing, prior to fixing the guide channel, in particular the cartridge housing, to the vehicle. The guide channel preferably has a longitudinal slot, with a control cam of the control slider projecting through said slot, in order to cooperate with the closing lid.

In a further embodiment of the invention, the control slider cooperates with a control link arranged on the closing lid, in order to transfer the closing lid from a closed position to the opened position. The control link is preferably integrally molded to the closing lid.

In a further embodiment of the invention, the control slider is mounted for linear motion in parallel to a rotational axis of the closing lid. As an alternative, the control slider can also be mounted for linear motion coaxially to the rotational axis of the closing lid.

In a further embodiment of the invention, the control link has a ramp surface and an abutment surface of the control slider cooperates therewith. For that purpose, the control slider preferably has a control cam constituting the abutment surface which cooperates with the ramp surface of the control link.

In a further embodiment of the invention, the ramp surface extends with an inclination in relation to a trajectory of the control slider. As a result, displacement of the control slider necessarily applies torque to the closing lid.

In a further embodiment of the invention, the control link is arranged at least largely centrally between opposite lateral edge regions of the closing lid. The wording "at least largely" means that the control link is disposed in a central area of the closing lid, which preferably corresponds to a third of the length of the closing lid, such that on both sides of the central area two lateral areas of the closing lid remain that each also represent a third of the length of the closing lid.

BRIEF DESCRIPTION OF THE DRAWINGS

Further advantages and features of the invention will become apparent from the claims and from the description below of a preferred exemplary embodiment of the invention, illustrated with reference to the drawings.

DETAILED DESCRIPTION

A shading device 3 according to FIGS. 1 to 10 is intended for a side window pane 2 of a side door 1 of a passenger vehicle. The shading device 3 is fitted to the side door 1 from a vehicle interior side. The shading device 3 has on each of opposite sides of the side window pane 2, extending in the vertical direction of the vehicle, respective guiding rails 4 which are installed fixed to the door on a corresponding window pane frame. The side window pane 2 is for closing or exposing an opening area in a door frame of the side door 1. The guiding rails 4 are fixed to corresponding lateral frame areas of the door frame. In the vicinity of a vehicle sill, i.e., on a lower limitation, extending in the longitudinal direction of the vehicle, of the door opening closed by the side window pane 2, a cartridge housing 5 extends over the entire length of said door opening, and a flexible shading structure 8 in the form of a roller blind sheet is held on a winding shaft 9 to be wound up and wound off. The winding shaft 9 is rotatably mounted within the cartridge housing 5. The cartridge housing 5 is installed fixed to the door. Advantageously, the cartridge housing 5 and also the other components of the shading device 3 below the door sill are concealed by a door interior paneling in the customer-ready final condition of the passenger vehicle. The cartridge housing 5 constitutes a chamber which has a passage towards the side window pane 2 towards the top, and through said passage the shading structure 8 can be deployed upwards in order to shade the side window pane 2. The passage also extends over almost an entire length of the cartridge housing 5.

The passage is capable of being closed by a closing lid 7 which is mounted to be pivotable about a pivot axis 13 in relation to the cartridge housing 5 between an opened position and a closed position. The closing lid 7 extends over the entire length of the passage and closes the passage in the closed position. The closed position of the closing lid 7 is shown with reference to FIGS. 2, 5, 6, 7, 8, 9. The opened position of the closing lid 7 is shown with reference to FIG. 1 and FIGS. 3, 4 and 10. Bearing elements 14 are provided for pivotable mounting of the closing lid 7 about the pivot axis 13 in the vicinity of a top side of the cartridge housing 5, on the one hand, and in the vicinity of a bottom side of the closing lid 7, on the other hand. The pivot axis 13 extends in parallel to a rotational axis of the winding shaft 9.

The shading structure has a dimensionally stable pull-out profile 6 on an end face region that is in front in the pull-out direction, wherein the opposite end face regions of the profile are guided in guiding rails 4 fixed to the door for longitudinal displacement. For that purpose, each end face region of the pull-out profile 6 is fixed to an entrainer 11 which is guided in the respective guiding rail 4 for longitudinal movement. For longitudinal displacement of the respective entrainer 11 in the vertical direction of the vehicle in the respective guiding rail 4, a drive transmission means 10 is provided, at present in the form of a flexshaft, also referred to as a thread shaft. With reference to the FIGS. 2 to 10 are illustrated: the right-hand side entrainer 11—as seen from the interior to the side door 1—and the right-hand side flexshaft 10. The opposite end face region of the pull-out profile 6 is guided in a similar manner. Both the drive transmission means 10 are driven in the guiding rails 4 by means of a drive unit, preferably by means of an electric motor. Upon activation of the drive unit, the drive transmission means 10 are shifted in the opposite guiding rails 4 synchronously in relation to each other, whereby the pull-out profile 6 is displaced in parallel to the rotational axis of the winding shaft 9 upwards and downwards. As a result, the shading structure 8 is necessarily also wound off the winding shaft 9 and pulled out upwards or wound up on the winding shaft 9 and lowered downwards, in response to the direction of movement of the pull-out profile 6.

The shading device 3 includes a mechanical forced control for opening and closing the closing lid 7 in response to a displacement movement of the pull-out profile 6. Using a spring device 22, force is applied permanently to the closing lid 7 in the direction of the closed position thereof, as is apparent from FIGS. 5 and 6 with reference to torque arrows not explained in more detail. The spring device 22 embodies a closing spring device, since it exerts a torque in the closing direction on the closing lid 7 about the pivot axis 13. As long as the flexible two-dimensional structure 8 is in its closed position, the closing lid 7 is, consequently, held in its closed position according to FIGS. 2, 5 to 9.

The closing lid 7 is associated with a control mechanism performing forced control of the closing lid 7 in the opened position thereof according to FIGS. 1, 3, 4 and 10, once the entrainers 11 and, thus, the pull-out profile 6 are deployed upwards from the rest position in the chamber of the cartridge housing 5. The control mechanism comprises a deflection device 12, 18, 27 and a control slider 19 cooperating with a control link 15 on a bottom side of the closing lid 7 by means of a control cam 16. The control slider 19 is mounted in a guide channel of a guide housing 28 for linear motion. The guide housing 28 is fixedly connected to the cartridge housing. As an alternative, the guide housing 28 can also be fixed to a door paneling and, as a result, be disposed fixed to the door. A longitudinal axis of the control slider 19, with the control slider 19 being guided alongside said axis in the guide channel of the guide housing 28, is oriented in parallel to the pivot axis 13 of the closing lid 7 and in parallel to the rotational axis of the winding shaft 9. As an alternative, the control slider can be guided in an at least sectionally curved sliding track. The guide channel is positioned a distance below the pivot axis 13 of the closing lid 7. The control cam 16 is fixedly connected to the control slider 19, preferably integrally molded thereto, and projects through an elongated slot 17 in a top side of the cartridge housing 5 and beyond the top side of the cartridge housing upwards. The control cam 16 constitutes an abutment surface in the vicinity of the top side thereof, which contacts a curved ramp surface of the control link 15. The control link 15 projects downwards from a bottom side of the closing lid 7.

The control slider 19 has an extension 26 pointing towards the center of the cartridge housing 5, which extension can constitute a guiding prolongation for the control slider 19 and/or can constitute a connection to a further slider section of the control slider which can cooperate with a further sliding section of the closing lid 7 in a way not illustrated. The function of said second control slider section and of the second sliding section is identical to the function as illustrated with reference to FIGS. 2 to 10, so that the not illustrated sections do not need to be discussed in more detail herein.

The control slider 19 has on an end face exterior area, facing the guiding rail 4 and, consequently, the drive transmission means 10 and the entrainer 11, an elongated hole guide 20 with a lever arm 27 of a pivot lever being articulated thereto by means of a hinge point 21. The elongated hole guide 20 is oriented transverse to a linear movement direction of the control slider 19. The pivot lever is mounted to be pivotable about a rotational axis 18 and has, in addition to the lever arm 27, a transmission arm 12 projecting approximately at right angles in relation to the lever arm 27 from the rotational axis 18 laterally outwards, said transmission arm projecting into a trajectory of the entrainer 11. The cartridge housing 5 is recessed in the vicinity of the transmission arm 12 in order to allow limited pivotability of the transmission arm 12. As is apparent in FIGS. 2 to 6, the transmission arm 12 has an extension bent at right angles into the trajectory of the entrainer 11. The bearing axis 18 is oriented in parallel to a hinge axis of the hinge point 21 so that the pivot lever including the lever arm 27 and the transmission arm 12 are pivotably mounted in a pivot plane which is at least largely in parallel to an exterior wall of the cartridge housing 5. The pivot lever is mounted to the cartridge housing 5 for pivoting movement via the bearing axis 18.

A spring unit 24 designed as a tension spring unit 24 and embodied as a screw tension spring engages the hinge point 21. Thereby, torque is applied to the lever arm 27 about the bearing axis 18 to urge the lever arm 27 permanently against the control slider 19. The lever arm 27 is limited in its pivot mobility between two final positions. One final position is illustrated with reference to FIGS. 2, 5, 6, 7, 8, 9 and the other final position is illustrated with reference to FIGS. 3, 4, 10. The latter final position defines the opened position of the closing lid 7. In contrast, the first final position defines the closed position of the closing lid 7. In the final position defining the opened position of the closing lid 7 the control slider 19 abuts axially the guide housing of the guide channel via a stop, not described in more detail but apparent in FIG. 10. The other final position of the pivot lever is defined by abutment of the transmission arm 12 on the entrainer 11 located in the rest position. Namely the support extension of the transmission arm 12 rests on the entrainer 11, in the vicinity of a bottom side of the entrainer, for the time being while the entrainer 11 and the pull-out profile 6 are in the rest position.

The screw tension spring acting as tension spring unit 24 is pretensioned in both final positions of the lever arm 27 such that a permanent tension force is exerted on the lever arm 27. For that purpose, the screw tension spring is articulated to the hinge point 21 with one spring end and to a holder 25 with an opposite spring end, wherein the holder is fixedly connected to the cartridge housing 5.

Figure 1:
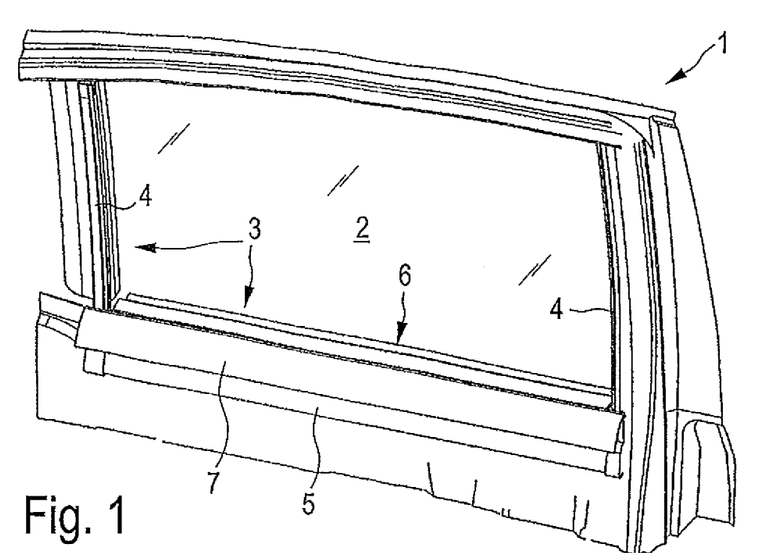
FIG. 1 shows in a perspective view an embodiment of a shading device according to the invention in the ready-for-use installed condition in the vicinity of a side door of a passenger vehicle.
Figure 2:
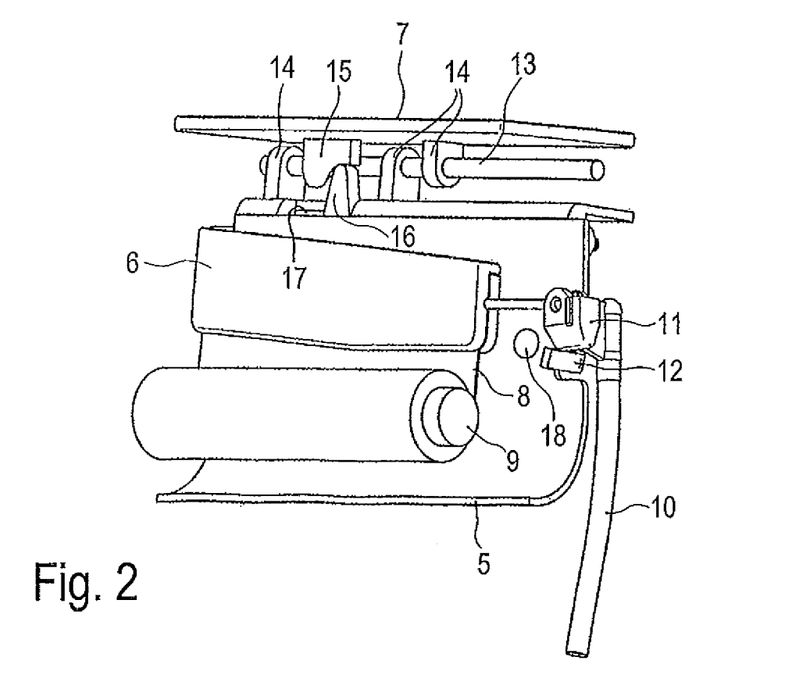
FIG. 2 shows schematically in a perspective view a section of the shading device according to FIG. 1.
Figures 3, 4:
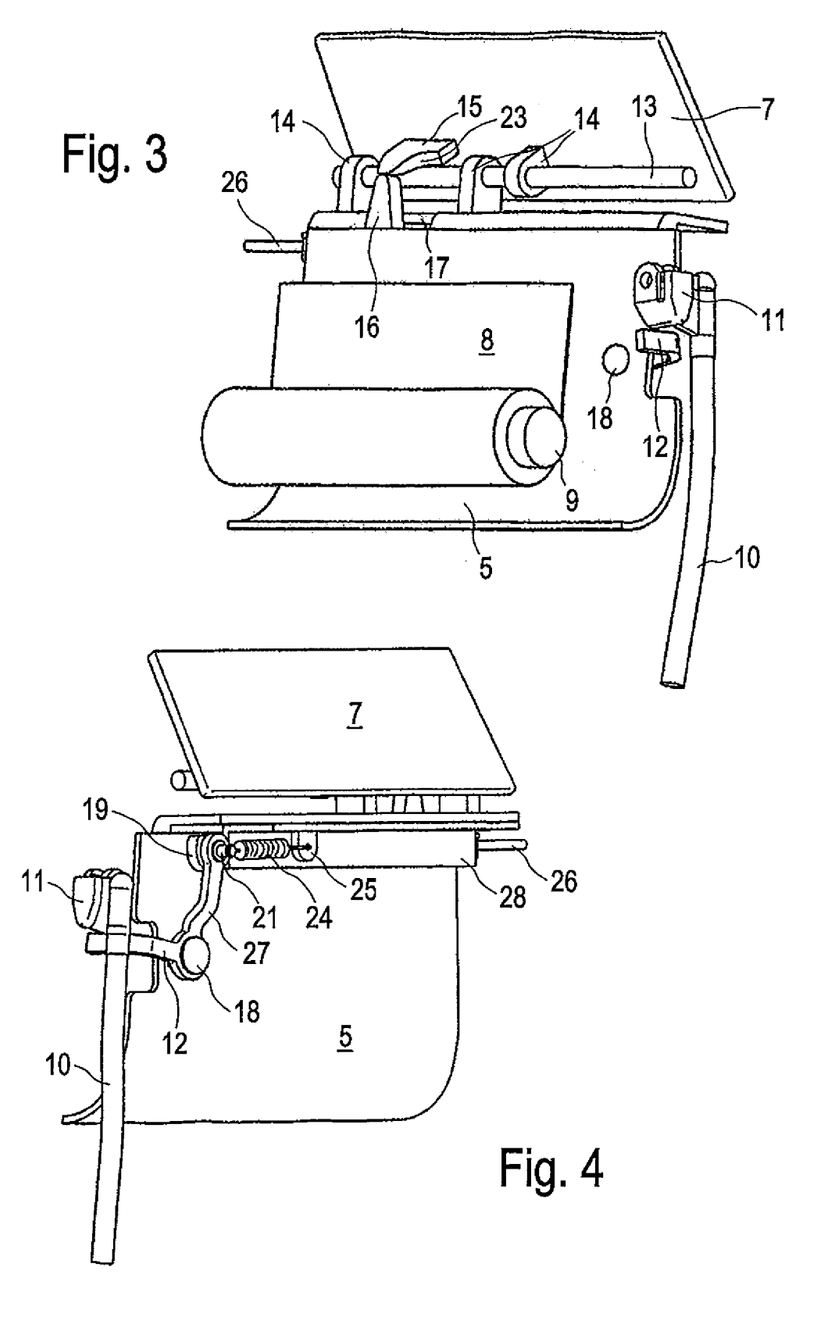
FIG. 3 shows the shading device according to FIG. 2 in another functional position.
FIG. 4 shows another perspective view of the shading device according to FIG. 3.
Figure 5:
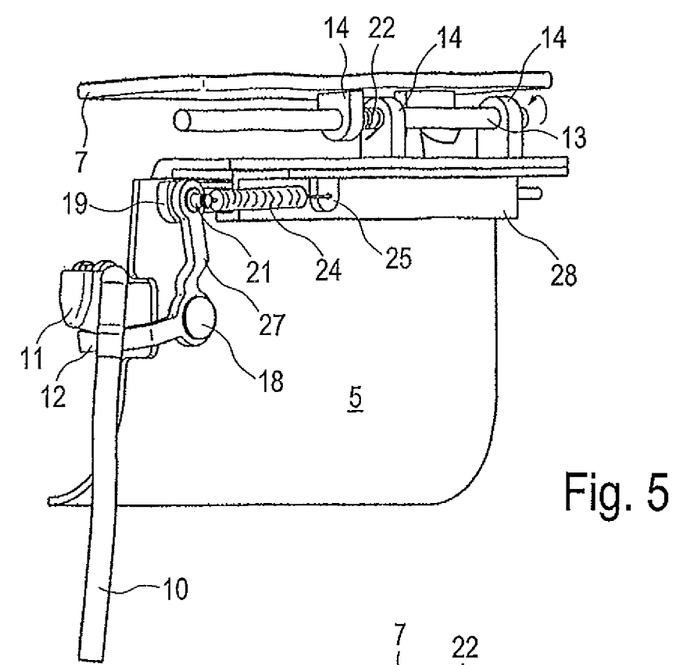
FIG. 5 shows the illustration according to FIG. 4 in a closed position of a closing lid.
Figure 6:
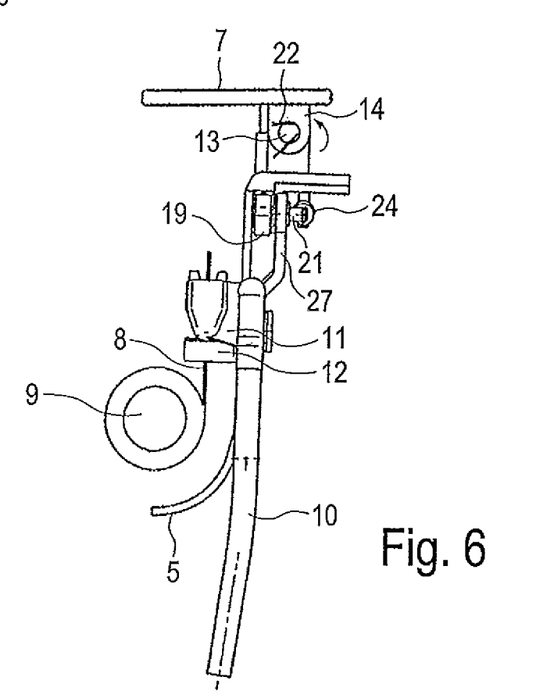
FIG. 6 shows a side view of the shading device according to FIG. 5.
Figure 7:
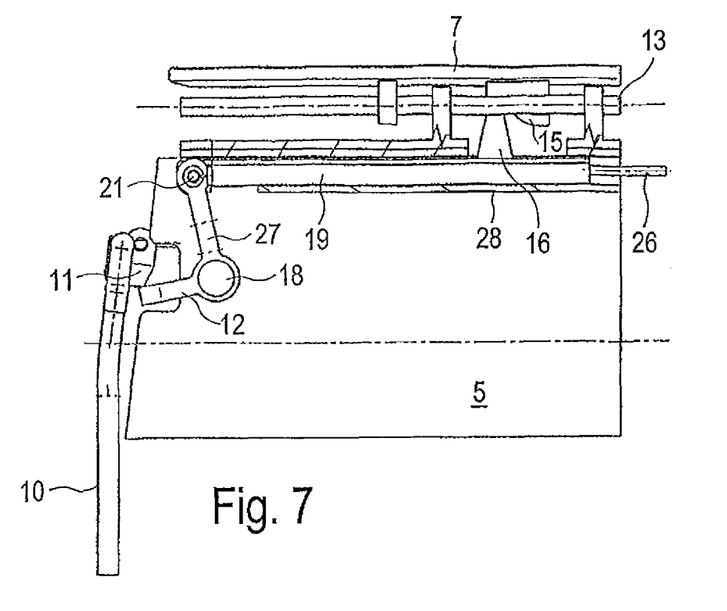
FIG. 7 shows in a partially sectional view the shading device according to FIGS. 2 to 6.
Figure 8:
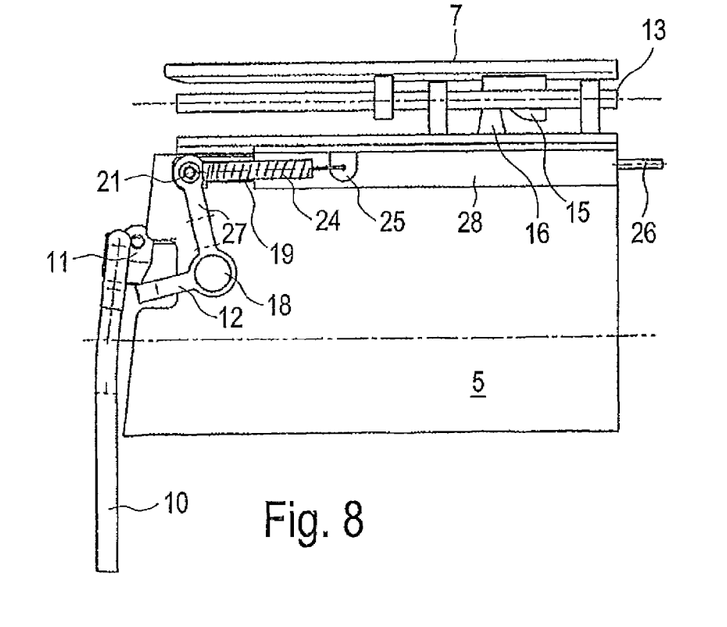
FIG. 8 shows a non-sectional view of the shading device according to FIG. 7.
Figure 9:
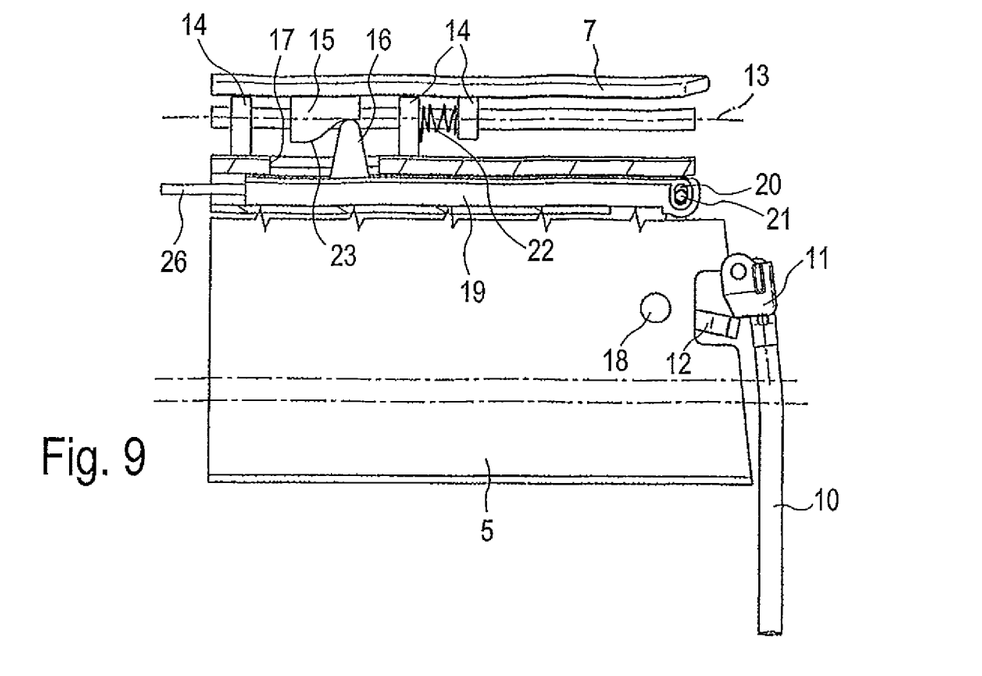
FIG. 9 shows a sectional view as seen from an opposite side analogous to FIG. 7.
Figure 10:
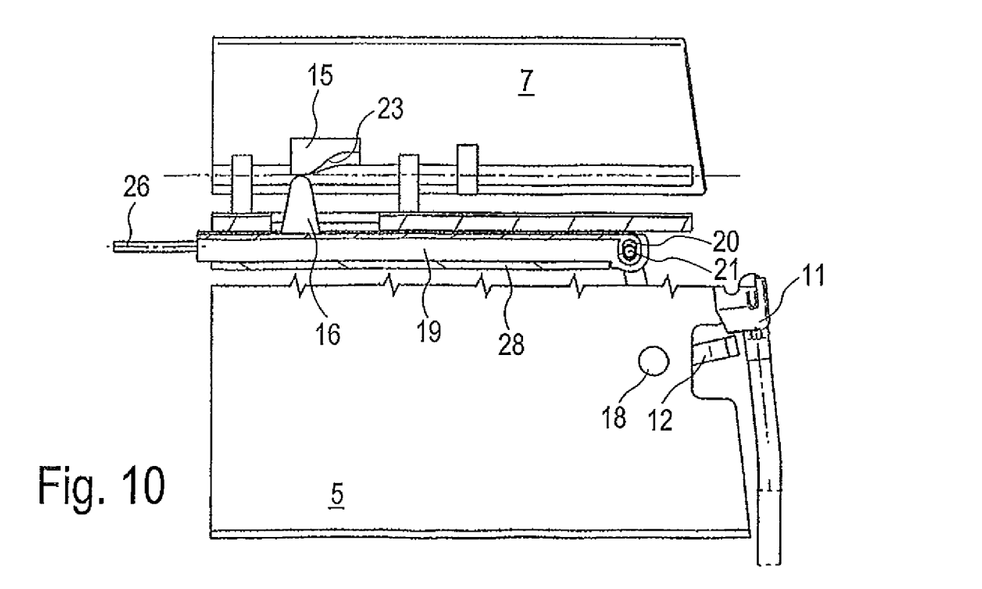
FIG. 10 shows a sectional view according to FIG. 9 in another functional position of the closing lid.

The control link 15 has, as illustrated in FIGS. 3 and 9, 10, in the vicinity of the bottom side thereof a ramp surface 23, curved in an arc-shape or S-shape, and the abutment surface of the control cam 16 slides there along, when the control slider 19 is shifted in the guide channel of the guide housing 28.

In the rest position of the shading structure 8 and, thus, in the rest position of the entrainer 11 and the pull-out profile 6, the transmission arm 12 rests on the entrainer 11 from below and retains the control slider 19 via the lever arm 27 and the hinge point 21 and the elongated hole guide 20 in a final position, wherein the control cam 16 according to FIGS. 2 and 5 to 9 rests on a valley section of the ramp surface 23 of the control link 15. In said position, the screw tension spring 24 is at maximum pretension.

When the entrainer 11 is then moved upwards using the drive transmission means 10, the transmission arm 12 is released, whereby the screw tension spring 24 pivots the lever arm 27 in the direction of the holder 25. Thereby, the control slider 19 is necessarily entrained and shifted in linear motion within the guide channel. During said procedure, the abutment surface of the control cam 16 slides from the valley section of the ramp surface 23 over the ascending slope section up to a peak section of the control link 15, whereby necessarily the closing lid 7 is pivoted upwards to its opened position. The control cam 16 is shifted within the longitudinal slot 17 during said movement. Once the control cam 16 has reached the peak section of the ramp surface 23, the control slider 19 axially abuts an end face of the guide channel. Even in said final position of the control slider 19 the screw tension spring 24 still exerts tensile stress on the lever arm 27 so that the control slider 19 with its stop is held pressed against the end face of the guide channel. As a result, the closing lid 7 remains in its opened position until the shading structure 8 is moved back down again by the pull-out profile 6 and the entrainer 11 comes to abut on the transmission arm 12 and entrains the transmission arm 12 downwards again. The torque applied via the entrainer 11 on the transmission arm 12 by a corresponding downwards move is greater than the counteracting torque of the screw tension spring 24 acting on the lever arm 27 so that the lever arm 27 is pivoted back counter the tensional force of the screw tension spring 24, whereby the control slider 19 is also shifted back to its original initial location.

The elongated hole guide 20 is provided to cause length adjustment between the linear mobility of the control slider 19 and the pivot mobility of the lever arm 27.

Opening the closing lid 7 using the forced guidance, as described, is obtained counter to the spring force of the closing spring device 22. Thus, when the control slider 19 is moved back again, the closing spring device 22 urges the closing lid 7 necessarily back to the closed position, wherein the ramp surface 23 and the abutment surface of the control cam 16 are maintained in permanent contact.

The invention claimed is:

1. A shading device for a window pane of an automotive vehicle, comprising a housing including a passage and an accommodation chamber, a shading structure, lateral guiding rails, drive transmission arrangements movably guided in the lateral guiding rails, a pivotably-mounted closing lid and a control mechanism, the shading structure being displaceable between a lowered rest position and a deployed shading position in the lateral guiding rails with the aid of the drive transmission arrangements, the shading structure being lowerable through the passage into the accommodation chamber of the housing, the passage being closable by the closing lid, the control mechanism moving the closing lid, in response to a movement of the drive transmission arrangements, into an opened position, the control mechanism including a control slider movably mounted transverse to a direction of displacement of the shading structure and in operative mechanical connection to the closing lid, the control mechanism comprising a deflection device coupling the control slider to at least one of the drive transmission arrangements such that the control slider, upon a movement of the shading structure from the lowered rest position in a direction towards the deployed shading position, moves the closing lid to the opened position.

2. The shading device according to claim 1, wherein the control mechanism comprises a spring unit exerting on the control slider a permanent spring force which holds the closing lid in the opened position.

3. The shading device according to claim 1, further including a closing spring device disposed to exert a permanent torque on the closing lid in a direction of a closed position thereof.

4. The shading device according to claim 1, wherein the deflection device includes a control member and the one drive transmission arrangement includes an entrainer, the control member being actuated by the entrainer and being coupled to the control slider.

5. The shading device according to claim 4, wherein the control member is a pivot lever coupled to the control slider by a length adjustment element.

6. The shading device according to claim 5, wherein the length adjustment element is an elongated hole guide.

7. The shading device according to claim 2, wherein the spring unit is a screw tension spring.

8. The shading device according to claim 7, wherein the deflection device includes a control member coupled to the control slider and the screw tension spring engages the control member.

9. The shading device according to claim 1, wherein the control slider is mounted in a guide channel for linear motion, the guide channel being arranged fixed in location in relation to the accommodation chamber.

10. The shading device according to claim 1, further including a biasing member disposed to bias the closing lid in a closed position wherein the closing lid is disposed to close off the passage, the shading device including a control link arranged on the closing lid, the control slider cooperating with the control link to transfer the closing lid from the closed position to the opened position.

11. The shading device according to claim 1, wherein the control slider is mounted for linear motion in parallel to a rotational axis of the closing lid.

12. The shading device according to claim 10, wherein the control link has a ramp surface and the control slider has an abutment surface disposed to cooperate with the ramp surface.

13. The shading device according to claim 12, wherein the ramp surface extends with an inclination in relation to a trajectory of the control slider.

14. The shading device according to claim 10, wherein the control link is arranged substantially centrally between opposite lateral edge regions of the closing lid.

* * * * *